United States Patent [19]
Leparskas

[11] 3,768,522
[45] Oct. 30, 1973

[54] FLOW CONTROL VALVE
[75] Inventor: Romas Leparskas, Warren, Mich.
[73] Assignee: Borg-Warner Corporation, Chicago, Ill.
[22] Filed: June 2, 1972
[21] Appl. No.: 258,954

[52] U.S. Cl. .................. 138/40, 251/25, 251/205
[51] Int. Cl. .............................................. F15d 1/10
[58] Field of Search .................. 251/61.3, 63, 25, 251/205, 206; 138/37, 40

[56] References Cited
UNITED STATES PATENTS
2,701,704  2/1955  Lawrence .................. 251/25
3,511,275  5/1970  Hewson .................. 251/25 X Primary Examiner—Arnold Rosenthal
Attorney—Donald W. Banner et al.

[57] ABSTRACT

A flow control valve employs a shiftable spool movable between free flow and restricted flow positions. A frictional dampening force is applied to the spool in the restricted flow position to retard spool oscillation. The valve permits relatively unrestricted flow when pressure is initially applied and thereafter may shift to throttle further flow through the valve. One application for the valve is to prevent sharp pressure rises in a cyclically operated pneumatic system.

2 Claims, 2 Drawing Figures

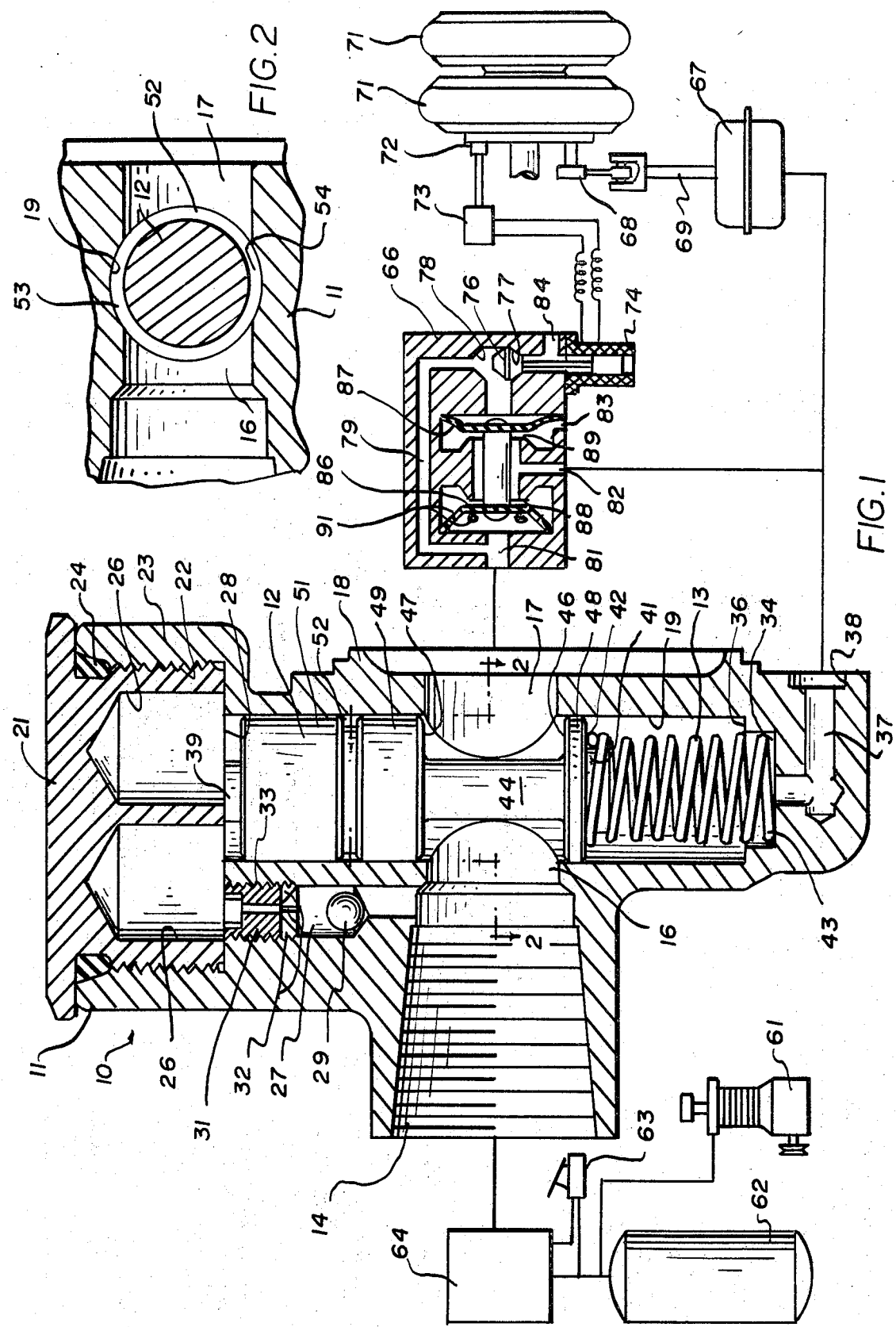

FLOW CONTROL VALVE

SUMMARY OF THE INVENTION

The present invention relates generally to flow control valves and more particularly to a pressure balanced valve employing frictional dampening.

It is an object of the present invention to provide a valve capable of shifting between free flow and restricted flow conditions employing frictional dampening to avoid cyclic fluttering in the restricted flow condition.

BRIEF DESCRIPTION OF THE DRAWING

FIG. 1 is a schematic sketch of a pneumatic circuit showing a section view of the valve according to the present invention; and FIG. 2 is a section view taken along the line 2—2 of FIG. 1.

DETAILED DESCRIPTION

Referring to FIG. 1, the flow control valve according to the present invention is indicated by reference character 10 and includes a body 11 having a spool 12 and spring 13 disposed therein.

Body 11 includes a threaded inlet port 14 for connection to a source of fluid pressure. A flow passage having an inlet portion 16 and an outlet portion 17 extend between the inlet port 14 and an outlet flange 18. Flow passage 16, 17 is intercepted by a transverse bore 19, one end of which is defined by a removable plug 21. The plug 21 includes a threaded portion 22 for engagement with a threaded portion 23 of body 11. A seal ring 24 is compressed between the plug and body adjacent the threaded portions to complete a fluid tight connection. Plug 21 includes cavities 26 providing communication between an auxiliary channel 27 and one end of the bore defined by the surface 28 of plug 21.

Auxiliary channel 27 extends between the flow passage inlet portion 16 and one of the cavities 26 in surface 28 of plug 21 permitting passage of fluid from the inlet passage 16 to the one end of bore 19. An orifice valve including a ball 29 and a valve seat 31 having serrations 32 therein is disposed in auxiliary channel 27, the valve seat 31 being secured in the channel by means of screw threads 33.

The other end of bore 19 is defined by the stepped shoulders 34, 36 and communicates with a control port 38 thorugh pilot channel 37.

Spool 12 has a boss 39 on one end thereof abutting the surface 28 at one end of bore 19. A boss 41 on the other end of spool 12 engages one end 42 of spring 13. The other end of spring 13 is seated in shoulder portion 34 at the other end of bore 19.

Spool 12 includes a first substantially unrestricted flow portion 44 defined by the spaced surfaces 46, 47 of land portions 48, 49. Portion 44 is spaced from end 39 of spool 12 so as to intercept passage 16, 17 when spool 12 is in a first position as illustrated in the drawing in which first end portion 39 abuts surface 28.

A third land portion 51 extends from end 39 toward land portion 49 being separated therefrom a small groove 52. The lands 49, 51 and groove 52 form a restricted aperture portion arranged to intercept passage 16, 17 when the spool is moved from its first position to a second position in which end portion 41 approaches the other end 36 of bore 19. As shown in FIG. 2, the flow passage 16, 17 is restricted by a pair of small apertures 53, 54 formed by the wall of bore 19 and the groove 52. When spool 12 is in its second position, flow through passage 16, 17 must pass through the apertures 53, 54 creating a pressure differential between inlet portion 16 and outlet portion 17. The pressure differential acting upon a portion of the surfaces of lands 49, 51 exert a lateral force on spool 12 tending to hold it in frictional engagement with the surface of bore 19.

OPERATION

In order to more fully appreciate the advantages of the above described valve, a description of the operation of the valve in combination with a typical circuit is set forth below.

An air brake circuit for a truck is typical of circuits in which the above valve may be employed. Such a circuit includes a compressor 61, and air reservoir 62, an operator control valve 63, and a relay valve 64 for supplying air under high pressure to the inlet port 14 of flow control valve 10.

The outlet flange 18 of flow control valve 10 is connected to the inlet of a remotely controlled pilot operated shuttle valve 66, the outlet of which is connected to control port 38 of flow control valve 10 and to a brake actuator 67. The vehicle brakes are applied by mechanical linkages 68, 69 extending from actuator 67. The deceleration of the wheels 71, 71 in response to the braking force is monitored by electronic devices 72, 73 which are effective to energize a solenoid 74 for moving valve 76 from seat 77 to seat 78 when an excess braking force has been applied as a result of excess pressure in actuator 67.

Shuttle valve 66 includes an inlet port 81, an outlet port 82, exhaust ports 83, 84, a pilot passage 79, a pair of diaphragms 86, 87 and a pair of valve seats 88, 89 diaphragm 86 having a series of apertures 91 formed therein.

When shuttle valve 66 receives pressure from valve 10, diaphragm 87 is moved against seat 89 by pressure in pilot passage 79. Pressure in inlet port 81 passes through apertures 91 to outlet port 82 supplying pressure to control port 38 and actuator 67.

When pressure is initially supplied to inlet port 14 of valve 10 from relay valve 64, ball 29 is moved against serrated seat 31 causing restricted flow through serrations 32. Spool 12 is retained in its first position by spring 13 permitting relatively unrestricted flow from passage portion 16, to passage portion 17 across spool portion 44. The pressure is exerted on end 39 of spool 12 by lfow through the serrations 32 and is exerted on end 41 of spool 12 by flow through shuttle valve 66, control port 38 and passage 37 with the result that spool 12 remains balanced in its first position.

If the pressure applied to the actuator results in excessive braking, solenoid 74 moves valve 76 to seat 78 exhausting pilot pressure through port 84 resulting in movement of diaphragm 86 against seat 88, and movement of diaphragm 87 away from seat 89. In this configuration of the shuttle valve, pressure from relay valve 64 is isolated from outlet port 82, and outlet port 82 is open to atmosphere through exhaust port 83. The pressure in actuator 67 and pilot channel 37 is reduced by flow through exhaust port 83. A pressure drop occurs between end 39 and end 41 of spool 12 resulting in movement of spool 12 to its second position in which lands 49, 51 and groove 52 intercepts passage 16, 17.

When pressure in actuator 67 is reduced sufficiently to avoid a locked wheel condition, valve 76 is moved to seat 77 by solenoid 74 which results in shuttling of diaphragms 86, 87 to reconnect system pressure to outlet 82 and the actuator 67. Since spool 12 is in its second position, the flow occurs through apertures 53, 54 resulting in a moderate rate of pressure rise in the actuator 67 and pilot channel 37. The pressure drop from passage portion 16 to passage portion 17 across the apertures 53, 54 forces spool 12 into frictional engagement with the surface of bore 19 thereby frictionally dampening movement of spool 12 toward its first position as the pressure rises in pilot channel 37 and on end end 41 of spool 12.

The above described valve employs a spool which permits relatively unrestricted flow initially, and threafter shifts to a flow restricting condition in response to a pressure reduction in a pilot channel. Once in the flow restricting condition, the pressure drop between the valve inlet and outlet is employed to frictionally dampen movement of the spool. The valve is particularly useful in pneumatic skid control brake systems for permitting relatively unrestricted normal brake applications, but being effective to moderate pressure rises during skid control cycling of the system.

What is claimed is:

1. A flow control valve having a body including a flow passage extending therethrough, a transversely extending bore intersecting said flow passage defining inlet and outlet portions of said flow passage, an auxiliary channel extending between said inlet passage portion and one end of said bore, a pilot channel extending between the other end of said bore and a control port; said flow control valve having a spool member and biasing spring disposed end to end in said bore intercepting said flow passage, said spool member having a first end portion abuttable against said one end of said bore and a second end portion engaging one end of said spring, said other end of said spring engaging said other end of said bore, said spring urging said spool toward a first position in which said first end portion of said spool is in abutment with said one end of said bore, said spool being movable to a second position in which said first spool end portion is spaced from said one end of said bore in response to a preselected pressure differential between said one and other ends of said bore, said spool being so constructed and arranged as to permit relatively unimpeded flow through said flow passage when said spool is in said first position, said spool including a restricted aperture portion in which a substantial area of the spool surface is disposed within said passage for impeding flow through said passage when said spool is in said second position, said aperture portion providing a pressure differential between said inlet and outlet passage portions in response to flow through said passage for creating frictional drag between the surfaces of said spool and bore thereby frictionally dampening movement of said spool.

2. A flow control valve according to claim 1 having orifice valve means disposed within said auxiliary channel permitting restricted flow toward said one end of said bore and permitting unrestricted flow from said one end of said bore, said orifice valve means being effective to delay movement of said spool from said first position to said second position.

* * * * *